UNITED STATES PATENT OFFICE.

FERDINAND GERHARD WIECHMANN, OF NEW YORK, N. Y., ASSIGNOR TO FENOFORM CORPORATION, OF HASTINGS-UPON-HUDSON, NEW YORK, A CORPORATION OF NEW YORK.

PROCESS FOR MAKING AN ANHYDROUS REACTION PRODUCT OF PHENOL AND FORMALDEHYDE.

1,080,188.   Specification of Letters Patent.   Patented Dec. 2, 1913.

No Drawing.   Application filed January 30, 1912.   Serial No. 674,243.

*To all whom it may concern:*

Be it known that I, FERDINAND GERHARD WIECHMANN, a citizen of the United States, residing at New York city, in the county and State of New York, have invented certain new and useful Improvements in Processes for Making an Anhydrous Reaction Product of Phenol and Formaldehyde, of which the following is a specification.

My invention consists in the process of making an anhydrous reaction product of phenol and formaldehyde by a single reaction, and further, the process of making a composite body containing an anhydrous reaction product of phenol and formaldehyde with a suitable filling material, as also a new article of manufacture consisting of an anhydrous reaction product of phenol and formaldehyde alone or associated with a filler, and other bodies such as abrading materials, alone or associated with coloring materials and the like.

One of the objections to processes heretofore suggested for making condensation products of phenol and formaldehyde is found in the fact that more or less water is formed in and retained by the initial condensation product, which when such product is used alone or is combined with other materials, is objectionable, in that when such initial condensation product alone or combined with other materials, is subjected to heat to effect polymerization, such water is set free and vaporized in the form of steam, and makes the secondary product spongy, which action can only be overcome by subjecting the initial condensation product or the initial condensation product and the other materials, during the process of manufacture into commercial forms, to the simultaneous action of heat and pressure.

The object of my invention, therefore, may be stated to be the production of an initial reaction product which contains no water and which may be molded alone or in combination with other materials, and which during molding and during final polymerization by heat, does not form water or evolve vapors, does not form a spongy mass and therefore does not in the final treatment, require the simultaneous application of heat and pressure.

To carry my invention into effect, I take a determined quantity of crystallized carbolic acid, phenol ($C_6H_6O$) or some of its homologues, for instance, 100 parts of any one of the above mentioned substances; I may, however, also combine several of these substances in the 100 parts. To this I add paraform ($C_3H_6O_3$) in the form of a dry powder. Instead of using paraform, I may use any dry or condensed type of formaldehyde, either in the form of a solid or a gas, for instance, from 10 to 35 parts of paraform or its equivalent, according to certain qualities of the product desired, to 100 parts of the substance or substances first mentioned. After these bodies are mixed, I subject them to the action of heat, *i. e.*, that approximating their boiling point, and which heat should be continued for a definite time, as hereinafter stated. When *e. g.* 100 parts of phenol are used with 35 parts of paraform the mixture begins to boil usually below 110° C. During all or part of the time the combined substances are subjected to heat, I also subject them to the action of dry ammonia gas, or any other body which will facilitate the production of an anhydrous reaction product of phenol and formaldehyde. This process requires about three hours for its completion, and the product is a viscous, syrupy looking body, which upon test with anhydrous copper sulfate will be found to be substantially free from water. The reaction taking place in the above process I would state to be as follows: dry phenol ($C_6H_6O$) plus dry formaldehyde ($CH_2O$) plus dry ammonia ($NH_3$) = dry reaction product of phenol and formaldehyde.

The product obtained from the treatment as above described, has the following physical characteristics: It is an anhydrous, viscous non-hygroscopic syrup, is soluble in a mixture of 80% methyl alcohol and 20% amyl alcohol; it may be mixed with many bodies, such for instance as wood pulp, asbestos, vegetable or animal albumen, cellulose, abrading materials, coloring materials, sulfur, rubber, or in fact with most materials comprehended in the terms organic and inorganic bodies.

The anhydrous reaction product may be used as a varnish or a lacquer, alone or combined with solvents such as alcohols, etc., coloring matters, and the like. The reaction product above described, when subjected to heat alone, presents the following characteristics: when subjected to heat of about 80° centigrade for some hours, passes into the solid condition, but is still softened by heat. After a further heating for several hours more, at a temperature of about 90° centigrade, it is changed in such a manner that it is no longer readily soluble in the solvent alcohols, as above described, nor in many other solvents, but is still softened by heat and may be placed into molds and is easily shaped to form articles of manufacture. It may also be combined with the substances heretofore mentioned to form such articles. When in this state the product may be molded with or without pressure; when pressure is used, however, this merely acts to give form, and not to prevent the evolution of gaseous vapors which would tend to convert the material into a spongy body. When this last named form of the material is further subjected to a heat of approximately 160° to 180° C., it quickly becomes an insoluble, infusible body, which is insoluble in boiling water and most chemical reagents. This same result is obtained when the product is exposed to a lower heat for a longer time. In this final form it cannot be melted or molded.

What I wish to have understood is that I believe I am the first to describe a process for producing, by one reaction, an anhydrous reaction product of phenol and formaldehyde, and further, to suggest the combination of such product with protein, cellulose, albuminous and similar bodies of vegetable origin, as well as of bodies of mineral origin, alone or incorporated with coloring matters, bleaching agents, and the like.

Generally, I claim as my invention, any method of producing an anhydrous reaction product of phenol and formaldehyde and every body with which such body may be incorporated.

The term anhydrous is used herein in referring to the product of the present invention as meaning free from water as indicated by test with anhydrous copper sulfate.

Having thus described my invention, I claim:

1. The process of producing an anhydrous reaction product of phenol and formaldehyde which comprises heating a mixture of substantially anhydrous phenol and formaldehyde in the presence of an agent promoting the formation of such product until a liquid anhydrous product results insoluble in water.

2. The process of producing an anyhdrous reaction product of phenol and formaldehyde which comprises heating a mixture of substantially anhydrous phenol and paraform in the presence of an agent promoting the formation of such product until a liquid anhydrous product results insoluble in water.

3. The process of producing an anhydrous reaction product of phenol and formaldehyde which comprises heating a mixture of substantially anhydrous phenol and formaldehyde in the presence of dry ammonia until a liquid anhydrous product results insoluble in water.

4. The process of producing an anhydrous reaction product of phenol and formaldehyde which comprises heating a mixture of 100 parts of crystallized carbolic acid and from 10 to 35 parts of paraform in the presence of an agent promoting the formation of such product until a liquid anhydrous product results insoluble in water.

5. As a new article of manufacture an anhydrous reaction product resulting from the interaction of phenol and substantially water-free formaldehyde, being a viscous syrupy liquid at ordinary temperatures, non-hygroscopic, insoluble in water, and disclosing no water present upon test with anhydrous copper sulfate.

In testimony whereof, I affix my signature, in the presence of two witnesses.

FERDINAND GERHARD WIECHMANN.

Witnesses:
FRANCES KINREICH,
HELEN E. KOELSCH.